United States Patent Office 3,743,599
Patented July 3, 1973

3,743,599
COALESCING FILTERS FOR OIL-WATER SEPARATORS
Guilford B. Peters, Mendham, N.J., assignor to Brunswick Corporation, Skokie, Ill.
Filed Mar. 17, 1972, Ser. No. 235,621
Int. Cl. B01d 27/04
U.S. Cl. 210—490                                     3 Claims

ABSTRACT OF THE DISCLOSURE

A coalescing filter for an oil-water separator is described. The illustrated embodiment of the filter comprises a winding of multifilament twisted nylon yarn completely enclosed by a winding of multifilament twisted polypropylene yarn. Both windings are impregnated with an oleophilic resin which, together with oil, forms a membrane that coalesces even emulsified oils.

BACKGROUND OF INVENTION

Field of invention

This invention is a coalescing filter (U.S. Class 210–488) and, more particularly, is a coalescing filter particularly adapted for use in vertically-stacked separation chamber systems used for breaking up oil-water emulsions.

Description of prior art

Increasing concern over protecting water resources from contamination has stimulated the development of better systems for removing oil and other immiscible liquids from water. Oil discharges are found when bilge tanks are flushed, rancid machine cutting oils are drained and the like.

Separation of oil from water is economically very attractive because the bulk of a mixture, such as a cutting oil emulsion, is water. The remaining constituent, being only a few percent of the weight, can be easily disposed of if it can be isolated. To carry out this process, a number of systems have been developed. One particular system found to be superior is described by C. H. Trillich in his commonly-owned, copending application for patent entitled "Oil-Water Separator," filed herewith. When used with the coalescing filter of this invention, the Trillich separator has lowered oil concentrations in water to less than seven parts per million or to about one-sixth the solubility level of oil in water.

The purpose of coalescing filters is to provide a site at which the fine particles of an emulsified liquid such, as oil, coalesce to form a large bubble which will float. Examples of prior art coalescing filters, and some separator systems which use them, are taught in the following U.S. patents:

3,471,401, Huval, Oct. 7, 1969
3,450,632, Olson, et al., June 17, 1969
3,268,442, Pall, et al., Aug. 23, 1965
3,229,817, Pall, Jan. 18, 1966
2,953,249, Topol, Sept. 20, 1960

These filters all comprise one or more layers of fiber batting as the principal separating element. The principal disadvantage of batting is that its pore size distribution is very broad. Further, pore size tends to become non-uniform as a function of time, pressure and method of assembly. Therefore, these prior art filters either start with low coalescing efficiency or drop to low efficiency with use as the emulsion "bleeds" through the large pores.

Accordingly, a principal object of this invention is to provide a coalescing filter of improved uniformity which is particularly adapted for oil-water separator systems where high efficiency is required. This, as well as other objects, features and advantages of this invention are more fully explained in the following description of a preferred embodiment in which.

DESCRIPTION OF A PREFERRED EMBODIMENT

Figure 1:
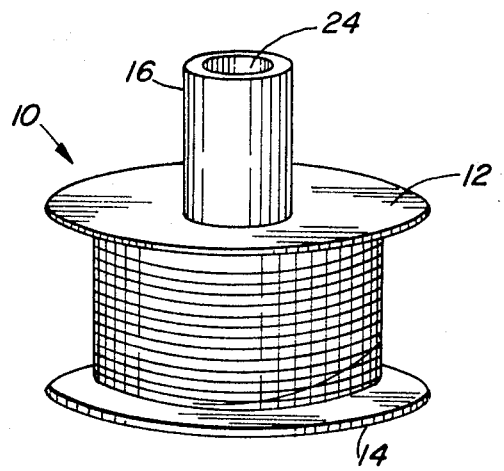
FIG. 1 is a isometric view of a coalescing filter of this invention.
Figure 2:
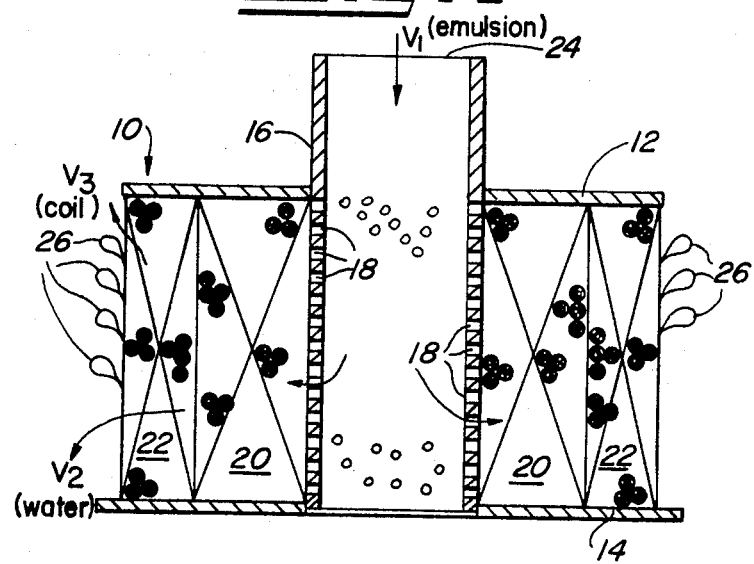
FIG. 2 is a cross-sectional view of the filter of FIG. 1.

A coalescing filter 10 for an oil-water separator is shown in FIGS. 1 and 2. The filter comprises a pair of flanges 12 and 14 spaced apart from each other on an perforate tube 16 [containing holes 18] which serves as the bobbin for coalescing windings 20 and 22.

Coalesing winding 20 is a winding of multifilament nylon twisted yarn which completely encloses the perforate tube 16 between flanges 12 and 14. The twisted yarn is applied in a conventional method which provides a close-spaced, uniform yarn distribution which will not be affected by handling, pressures and subsequent assembly procedures. The nylon winding is impregnated with an oleophilic resin which provides some mechanical stability to the winding and, more importantly, serves as a base for establishing an oil-resin membrane. As will be described later, the winding will be saturated with oil before use.

Next, coalescing winding 22 is applied in a similar manner. Coalescing winding 22 is a winding of multifilament polypropylene twisted yarn which completely covers the nylon winding 20 between the two flanges 12 and 14. As with winding 20, the polypropylene winding is also impregnated with an oleophilic resin and saturated with oil for use.

The use of two materials—nylon and polypropylene—provides unexpectedly good results. Polypropylene is known to be much more oleophilic and a much better coalescing material than nylon; however, by combining nylon and polypropylene windings as shown, a coalescence gradient is established. Thus, very little coalescence takes place near the tube 16 as the emulsion freely enters the winding 20 after passing through the inlet 24 of the filter 10. No oil coalesces inside the tube 16 to block operation. As the emulsion penetrates through winding 20, more and more oil particles coalesce. When the emulsion passes into winding 22, even the finest particles coalesce as the largest droplets formed in winding 20 are extruded into winding 22.

The process continues until large oil bubbles 26 form on the exterior surface of winding 22. When used in the Trillich separator, the velocity $V_1$ of the emulsion flowing into the filter is adjusted so that the downward velocity $V_2$ of the water is such that the buoyancy of the oil bubbles is just great enough to permit them to float upward at a small velocity $V_3$ to the top of the separator chamber for removal.

There is one further limitation on the magnitude of velocity $V_1$. The input velocity $V_1$ must not be so great as to cause the resin-oil membrane in the filter to be ruptured. Care must be taken to form and maintain this membrane, for it appears to be responsible for the superior results which have been achieved.

Before placing the filter in service, an oil-resin membrane must first be established. This is best accomplished by priming the windings 20 and 22 with an oil having approximately the same specific gravity as the oil to be separated. Priming can be facilitated by pre-wetting the windings with a solution of alum (pH of about 4.5) in a water or an oil-water solution. Once the oil starts to collect on the fibers, the alum can be discontinued. As the filter is used, the windings 20 and 22 will become saturated with oil, and the coalescing efficiency will increase until the filter is fully saturated.

When filters of this type were incorporated in the Trillich oil-water separator, they produced exceptional results. For example, coalescing filters of the following construction were used to separate rancid cutting oil from water:

Perforate tube:
  Inside diameter _____ ¾".
  Outside diameter _____ 1".
Flanges:
  Outside diameter _____ 4¾".
  Overhang _____ ⅛" beyond polypropylene winding.
  Separation _____ 1½".
Nylon yarn winding:
  Filament diameter _____ 25 microns.
  Filaments per yarn _____ 40 (approximately).
  Winding thickness _____ 1".
  Yarn condition _____ Natural.
Polypropylene winding:
  Filament diameter _____ 25 microns.
  Filaments per yarn _____ 40 (approximately).
  Winding thickness _____ ¾".
  Yarn condition _____ Crimped.
Resin _____ Wood rosin.
Flow rate _____ 2 g.p.m. (approximately).

The cutting oil constituted a five percent oil emulsion with phosphate emulsifiers. The discharge water contained less than 7 p.p.m. of oil. This is about one-sixth the solubility level of oil in water. By increasing the number of filters and separating chambers, still lower concentrations can be obtained. The filters can be scaled in size to accommodate the desired flow-rate—500 g.p.m., for example.

The embodiments of the invention, in which an exclusive property or privilege is claimed, are defined as follows:

1. A coalescing filter for an oil-water separator comprising:
   a pair of flanges spaced apart from each other on a perforate tube, one end of the tube being open and serving as the inlet for the filter;
   a winding of multifilament twisted nylon yarn completely enclosing the perforate tube between the two flanges, the nylon winding being impregnated with a oleophilic resin;
   a winding of multifilament twisted polypropylene yarn completely covering the winding of nylon filament between the two flanges, the polypropylene winding being impregnated with oleophilic resin.
2. The invention of claim 1 wherein the windings are: substantially saturated with oil.
3. The invention of claim 2 wherein:
   an oil-resin membrane is formed.

References Cited

UNITED STATES PATENTS 3,450,632  6/1969  Olson et al. _____ 210—491 X
3,517,820  6/1970  Mintz _____ 210—491

SAMIH N. ZAHARNA, Primary Examiner

F. F. CALVETTI, Assistant Examiner

U.S. Cl. X.R.

210—497